Patented May 1, 1934

1,957,150

UNITED STATES PATENT OFFICE 1,957,150

MEAT CURING METHOD

Levi Scott Paddock, Chicago, Ill., assignor to Swift and Company, Chicago, Ill., a corporation of Illinois No Drawing. Application July 13, 1931
Serial No. 550,623

2 Claims. (Cl. 99—1)

This invention relates to a novel method of curing meat products particularly characterized by producing, in addition to the usual cured meat characteristics, a desirable uniform red color for the lean portions thereof.

In marketing meat products it has been found that customers demand meat products which possess a bright red color for the lean portions, and although meats which do not possess a bright red color may be in a very respect as good as red meats it is necessary to cater to this preference in order to successfully overcome the sales resistance offered thereby. The meat packers on this account exert every effort to produce meat products which possess the desirable bright red appearance referred to.

Accordingly it is an object of this invention to provide a process by which meat products of bright red appearance are produced without difficulty or exception and in all cases the color of the meat products so treated is uniform throughout.

In order to assist in the understanding of this invention it is deemed advisable to point out that meat cures may be broadly divided into two types, the first of which is known as the wet cure and the second of which is known as the dry cure. In the first case the curing reagents are used in dry, crystalline form, whereas in the wet cure they are used in solution. The conventional curing reagents are sodium chloride, sodium nitrate and sugar. These reagents are used extensively today in commercial practice for dry cures.

It has been found that the familiar red color of the lean of cured meats is due to the presence of what is known as nitrous hemoglobin, which is produced by a reaction between a nitrite such as sodium nitrite and hemoglobin which exists in meat. The nitrite which enters into this reaction is present in the cures as now practiced in variable quantities which cannot be accurately determined and regulated because it is found that the nitrite present exists as a result of a breaking down action of the nitrate used as a curing reagent by certain bacterial action which takes place during the curing process. Inasmuch as the bacterial action cannot be regulated or controlled, the quantity of nitrite produced varies so widely in similar curing processes that oftentimes a certain percentage of the meat cured comes out with an undesirable gray color instead of the preferred bright red color.

In recent years the wet cure process has been modified to a slight extent so as to include a small quantity of a suitable nitrite in the curing solution in addition to the necessary curing nitrate, so as to assure the presence of the amount of nitrite necessary to produce nitrous hemoglobin and the consequent bright red color.

In this slightly modified process reliance is not placed upon the action of the bacteria to assure the presence of the proper amount of nitrite. A corresponding modification of the usual curing process is not practical for dry cures because of the powerful reaction on the meat resulting from the presence of nitrites in concentrated form. This makes for considerable difficulty, because most of the finer grades of meats, such as high grade bacon, are cured by the dry cure and consequently in such cases complete reliance must be placed on the unsatisfactory bacterial action for the production of the required amount of nitrite. The result is that a certain percentage of gray products results. Another marked disadvantage results from reliance upon the uncontrolled action of the bacteria on the nitrate, which is the liability of the breaking down action of the nitrate into nitrite going too far, resulting in detrimental effects on the flavor and quality of the cured meat product. The nitrate is essential and cannot be eliminated because it performs a very definite and valuable function as a preservative.

Accordingly the present invention provides for the separate and independent step in the treating process of soaking off-color or gray cured meats in a dilute solution of a suitable nitrite after the customary curing process has been completed. By this method the subsequent soaking treatment is not required for all meat products as those which possess the desirable red color produced by the nitrite resulting from the bacterial action in the curing treatment need not be further treated.

In practice it is preferable to employ sodium nitrite, but of course other nitrites, such as for instance potassium nitrite, can be used. It is preferable to employ a one-tenth per cent solution of sodium nitrite in water, usually in portions one part of sodium nitrite solution to approximately one part of meat. The soaking period may be varied according to the results desired, the character of the meat and the strength of the solution, and therefore the present invention should not be limited to solutions of any particular strength nor to soaking periods of any particular length of time. However, as a matter of illustration, good results have been obtained with the one-tenth percent solution of sodium nitrite with a soaking period of approximately four hours.

It should therefore be understood that the present invention relates to a process of curing meat products by a dry process in the usual manner including the subsequent step of treating off-color or gray products by subsequent soaking thereof for a desired period in a dilute solution of a suitable nitrite, such as sodium or potassium nitrite.

By the subsequent nitrite soaking treatment and the consequent assurance of good color on all of the meat products produced, conditions in the curing treatment can be regulated to avoid the danger of excessive bacterial action in breaking down the nitrate into excessive and harmful quantities of nitrite. This control can be exercised in the present invention at a sacrifice of producing good red color, as the color may be subsequently produced in the final soaking treatment.

I claim:

1. The process of curing meats, including the following steps: first, conducting the customary dry curing treatment, and, secondly, soaking those products so cured which do not possess the desired red color in a weak solution of a suitable nitrite.

2. The method of treating meat which has been dry cured which consists in immersing the dry cured meat in a nitrite containing pickle until the desired color has been developed.

LEVI SCOTT PADDOCK.